United States Patent [19]

van Buytene

[11] Patent Number: 4,566,377
[45] Date of Patent: Jan. 28, 1986

[54] APPARATUS FOR STORING AND VENTILATING CHEESES

[75] Inventor: Arie J. van Buytene, Santpoort-Zuid, Netherlands

[73] Assignee: Esmil Hubert B.V., Sneek, Netherlands

[21] Appl. No.: 624,208

[22] Filed: Jun. 25, 1984

[30] Foreign Application Priority Data

Jun. 29, 1983 [NL] Netherlands ............... 8302305

[51] Int. Cl.$^4$ .................. A01J 25/00; A01J 25/16
[52] U.S. Cl. ........................... 99/474; 99/452; 99/453; 99/473; 312/236
[58] Field of Search ............. 99/467, 473–476, 99/477, 478, 452, 453, 455, 517; 312/236; 62/404, 408; 34/195, 196, 212

[56] References Cited

U.S. PATENT DOCUMENTS 4,108,056 8/1978 Van Elten et al. ............... 99/452
4,249,482 2/1981 Harr ............................ 312/236 X

FOREIGN PATENT DOCUMENTS 7702023 5/1977 Netherlands.
7902942 10/1980 Netherlands.
8001717 10/1981 Netherlands.

Primary Examiner—Timothy F. Simone
Attorney, Agent, or Firm—Stevens, Davis, Miller & Mosher

[57] ABSTRACT

An apparatus for storing and ventilating cheeses has a plurality of shelves for the cheeses supported at their ends by hollow side walls so that the shelves are arranged vertically one above another. The side walls have passages within them for supply and discharge of ventilating air to the spaces above the respective shelves. To achieve a minimal spacing between shelves, while obtaining good air distribution over the cheeses, each said shelf has at least one longitudinal extending duct for conducting ventilating air along the shelf, which duct is connected at one end of the shelf to an air passage in the side wall and has, spaced longitudinally along the shelf, a plurality of openings for the ventilating air located at the underside of the shelf. Preferably each shelf has two such ducts, one for supply and one for discharge of air.

10 Claims, 6 Drawing Figures

APPARATUS FOR STORING AND VENTILATING CHEESES

BACKGROUND OF THE INVENTION

1. FIELD OF THE INVENTION

The invention relates to apparatus for storing and ventilating cheeses, comprising shelves for carrying the cheeses which are supported at their ends by two hollow sidewalls through which air can be supplied to and discharged from the spaces between the shelves.

2. DESCRIPTION OF THE PRIOR ART

An apparatus of the kind described above is known from Netherlands patent application 7702023. According to this proposal, a flow of conditioned air is forced across a certain number of cheeses, and its direction of flow is reversed from time to time. The hollow vertical walls are connected alternately to the air supply and extraction by means of a change-over valve; the hollow walls have openings to which pipes can be attached for directing the air-flow.

This arrangement has the disadvantage that the gap between the shelves lying one above another in the store has to be larger than the height of the cheeses, since an air flow of this kind cannot be directed straight at the cheeses because of the risk of local desiccation, and the pipes therefore require extra height.

Netherlands patent application 7902942 shows a cheese store in which an individual flow of conditioned air is passed over each cheese, from outlets connected directly to vertical pipes. No means for extracting the air are shown. This arrangement of vertical pipes makes removal and turning of the cheeses difficult and complicated.

SUMMARY OF THE INVENTION

The invention has as its object the provision of apparatus for maintaining cheeses in a store with ventilation, in which a very uniform ventilation of the cheeses can be achieved within a structure of limited height, while allowing easy insertion and removal of the cheeses on the shelves.

According to the invention in essence the shelves are each provided with at least one hollow longitudinal duct for the passage of the supply or discharge air, and this duct has inlet or outlet openings near the lower side of the shelf for distribution of air over the shelves, and at one end it has a connection to an opening in the appropriate sidewall.

The ducts are thus used for movement of air in a direction perpendicular to the supporting hollow side walls.

Especially in the storage of Edam cheese it is an advantage to have for each shelf both a supply and extraction duct, and this can be effected in a preferred embodiment of the invention in which each shelf has two longitudinal ducts for transport of the air respectively being supplied and discharged.

The inlet and outlet openings in the ducts of two adjacent shelves thus produce between two successive rows of shelves an air flow of such a kind that a mainly horizontal flow is obtained between the shelves in a direction roughly parallel to the sidewalls, i.e. across the width of the shelves, and the direction of this horizontal air flow alternates between each adjacent pair of ducts. This can have a number of advantages: the air experiences very little resistance; there is little chance for condensation from the fairly moist air, while there is adequate moisture removal; there is no longer any need to reverse the air flow through the hollow walls, so that a changeover valve and its associated equipment can be dispensed with; since the air mainly flows over only one cheese before extraction, the cheeses are exposed to a uniform but turbulent air flow.

The shelves are preferably constituted mainly of metal with two flanged edges of which at least one is shaped into one of said ducts and is provided with the openings for the ingress or exit of air. Preferably the shelves are each provided at each end with a moulded plastics component by which the shelf is supported slidingly in grooves in the side walls. This moulded component has a passageway which connects the duct in the shelf and with a corresponding supply or extraction opening for the air in the groove in the side wall.

In order to prevent the ventilation air from entering or leaving the store at undesirable places, flexible seals are preferably provided between the shelf and the side wall at the support locations of the shelf.

In order to keep the cheeses accurately positioned on the shelves, the shelves can be provided with depressions in their upper surfaces, these depressions having perforations. This has the advantage that the ventilation air can also reach the undersides of the cheeses well. The depressions can in this case take the form of slightly indented gauzes.

BRIEF INTRODUCTION OF THE DRAWINGS

Preferred embodiments of the invention will be described below by way of non-limitative example with reference to the accompanying drawings, in which.

DESCRIPTION OF THE PREFERRED EMBODIMENTS

Figure 1:
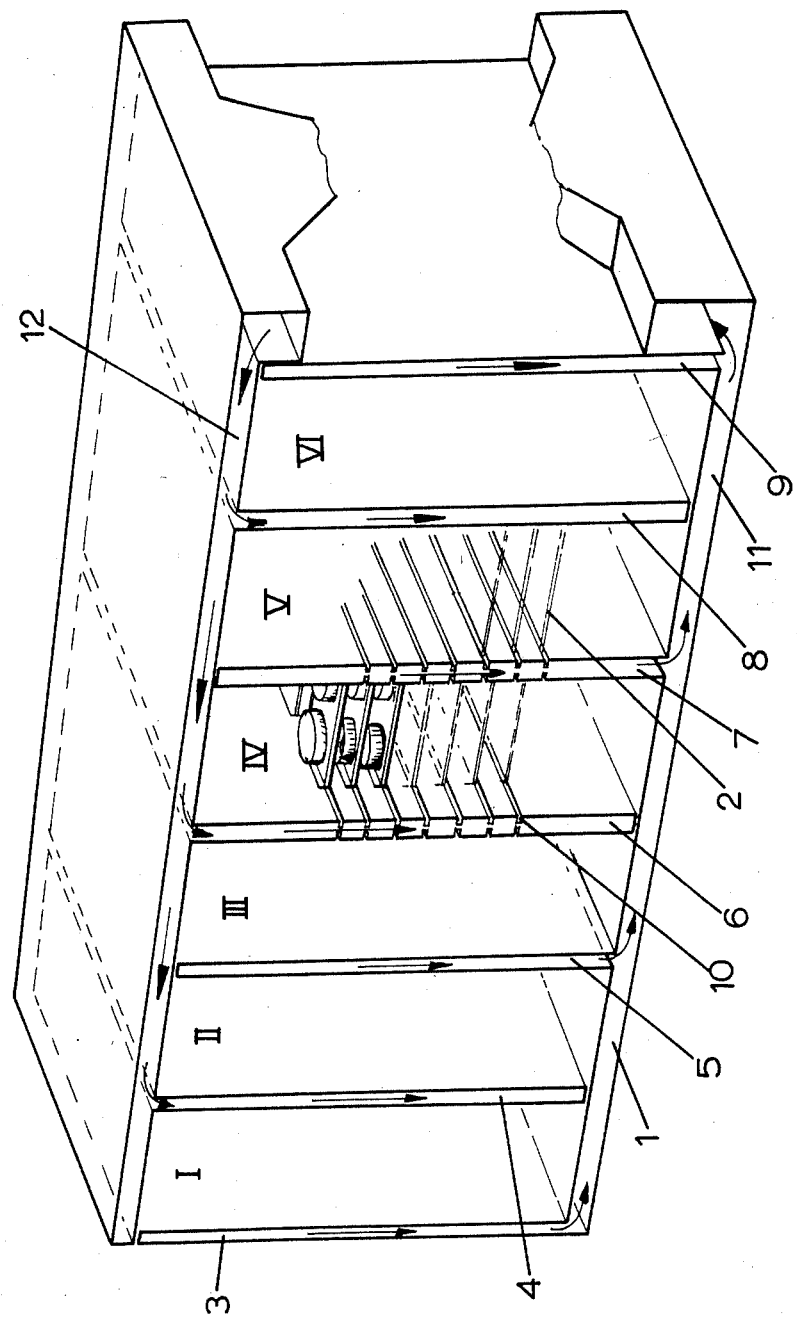
FIG. 1 is an isometric perspective sketch view of a cheese store embodying the invention with a number of cheese shelves shown and with the air flows in the side walls indicated.

FIG. 1 shows a cheese store embodying the invention. The store 1 is sub-divided by vertical walls 3–9 into for instance six sections I–VI as shown, and in each section there are cheeses (for example Gouda cheeses) laid on a plurality of shelves 2. The shelves 2 are arranged parallel in horizontal rows and at a plurality of heights. Each section I–VI is thus bounded by a pair of vertical side walls 3–9 which are provided at equal vertical intervals with supporting grooves 10, which form guides for slidingly receiving the extremities of the shelves 2. The side walls 3–9 are hollow and alternately closed off at the top and bottom. As may be seen in FIG. 1, the walls 3,5,7 and 9 are connected to the lower air duct 11 for discharge of air from the cheese storage spaces, and walls 4,6 and 8 are connected to the upper air duct 12 for supply of the ventilation air to the cheese storage spaces. The ends of the two ducts 11 and 12 are connected to a fan, an air-conditioning system and valves (all not shown) for providing and regulating the air flow; these can be of a conventional kind and do not require illustration.

For distributing the ventilation air from the vertical walls 4,6,8 over the cheeses and extracting it to the opposite walls 3,5,7,9 longitudinal ducts are provided in the shelves 2, and at the ends of the shelves these are connected to corresponding openings in the appropriate vertical side walls.

This is illustrated schematically by FIG. 2, wherein a cheese shelf 20 for Gouda cheese is represented as viewed from below. The cheese shelf 20 of width B is, as FIG. 3 shows, made of metal sheet and is provided with flanged edges 21 and 22, of which one edge 22 is shaped as a closed air duct extending longitudinally of the shelf. There are openings 23,24 respectively in the vertical portions of these flanged edges 21 and 22, in this case for the extraction of the ventilation air, which is removed via an opening connected to the relevant side wall (here given the reference 26) at the end 25 of the duct 22.

In the middle the shelf 20 is provided on the underside with a further longitudinal air duct 27 of rectangular cross-section made of metal sheet and having outlet openings 28 in its vertical side walls. The duct 27 is closed at one end 29 and at the other end 30 is connected to an opening in the left-hand side wall (here given the reference 31). This duct is for the supply of air to the cheeses.

Figure 2:
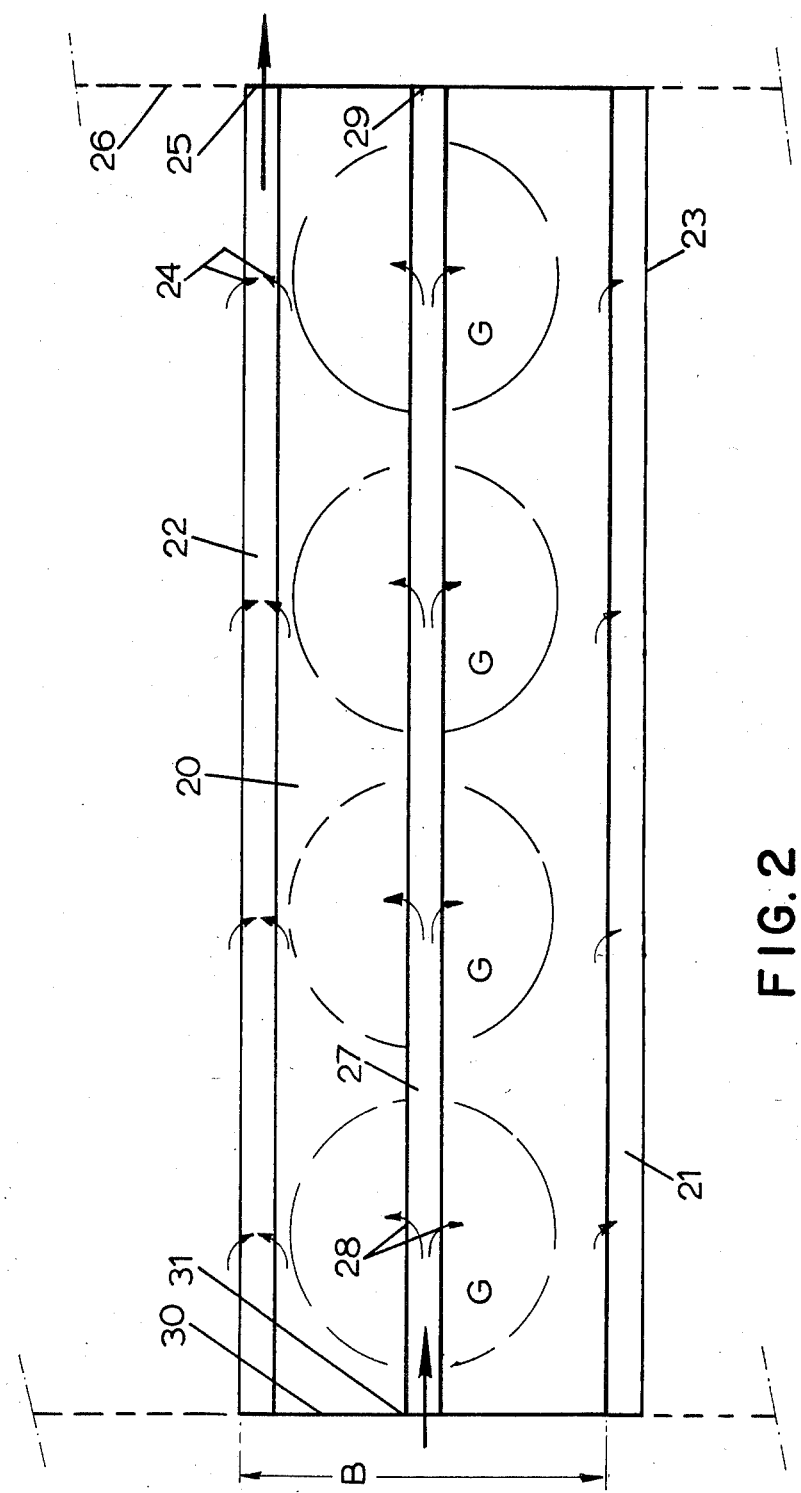
FIG. 2 is a schematic view from below of a cheese shelf of the embodiment of FIG. 1 for Gouda cheese, with the air flows indicated.
Figure 3:
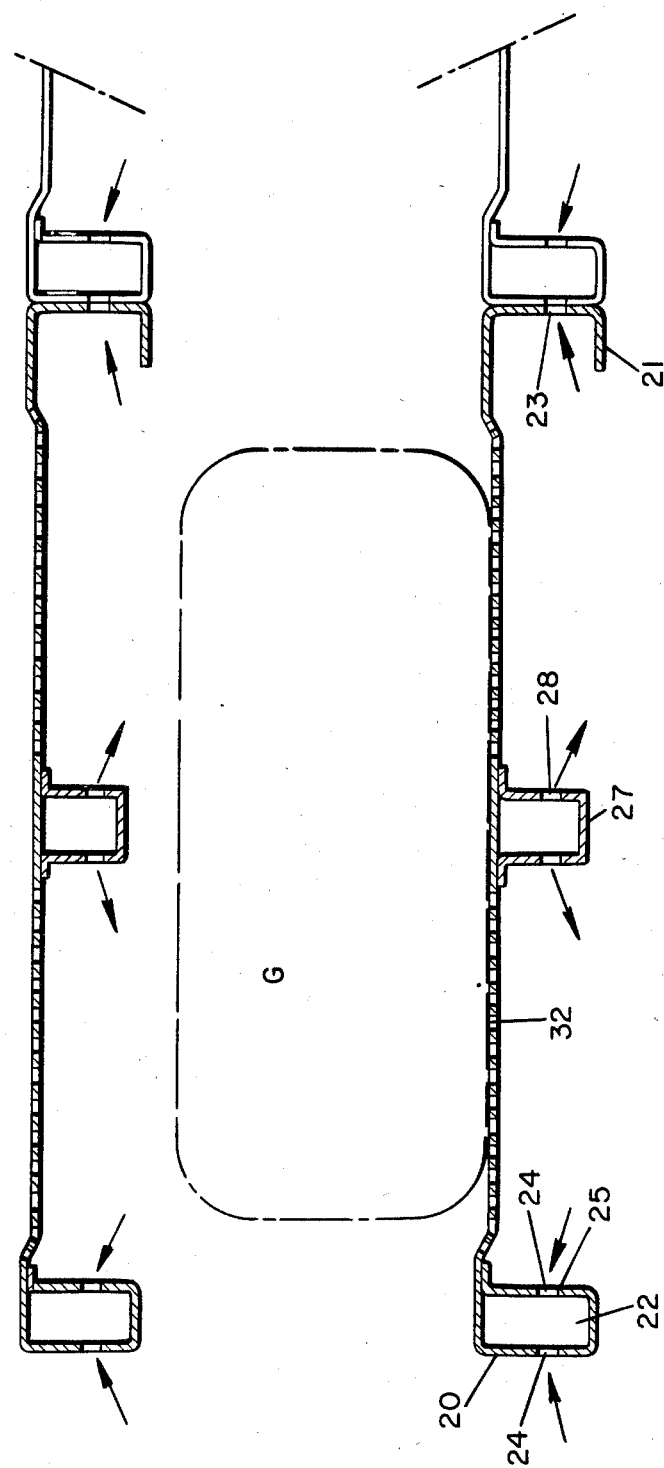
FIG. 3 is a cross-sectional view of several shelves of FIG. 2 for Gouda cheese, arranged side by side and above one another.

FIG. 3 shows parts of two horizontal rows of the shelves of FIG. 2, one above another. The flanges at the respective side edges of the shelves abut, and the openings 23 in the flange 21 of each shelf are in register with the openings 24 of the abutting flange 22 of the next shelf horizontally.

As may be seen from FIG. 3, a Gouda cheese, indicated schematically by G, is positioned in a circular depression 32 in the shelf which is perforated in order to allow the air to reach the underside of the cheese also and to make it easier to unload subsequently. This perforation of the depression 32 can be formed as a slightly indented gauze.

Although in FIGS. 2 and 3 the inlet openings 24 in the discharge duct 22 and the outlet openings 28 in the supply duct 27 are shown as lying precisely opposite one another, and also at the height of the centre of the circular depressions 32 for the positioning of the cheese G, this arrangement of the openings is not compulsory. It is possible to envisage another arrangement of the openings such as that in which the inlet and outlet openings in two successive parallel ducts are staggered.

FIGS. 2 and 3 also illustrate how the direction of air flow alternates between each adjacent pair of parallel ducts. Thus at the bottom left of FIG. 3, the air flow is to the left (from duct 27 to duct 22) while the next airflow is to the right (from duct 27 to flange 21). This provides a somewhat turbulent but gentle distribution of air over the cheeses, without a direct jet of air impinging on any cheese.

With the present apparatus no change-over valve is necessary; thus the longitudinal ducts can have a fixed supply or discharge function. Because of the principle that there should be no air flow onto the cheese, the outlet openings of an air supply duct in a support shelf are as shown located in one or more vertical side-walls of the duct, which is, for instance, of rectangular section. For the inlet openings of an air extraction duct this is not strictly necessary and they may just as well be located in the bottom wall of the discharge duct.

Figure 4:
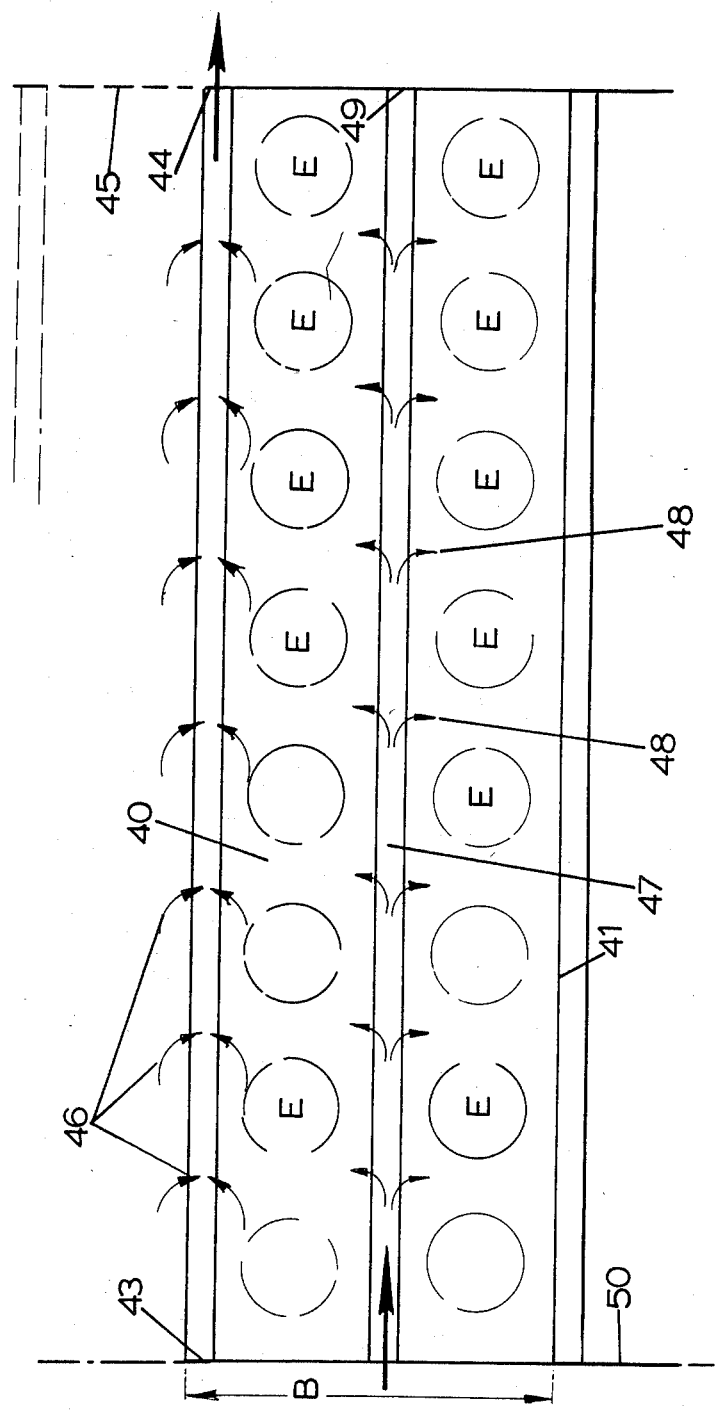
FIG. 4 is a schematic view from below of a cheese shelf for Edam cheese suitable for the apparatus of FIG. 1, with the air flows indicated.
Figure 5:
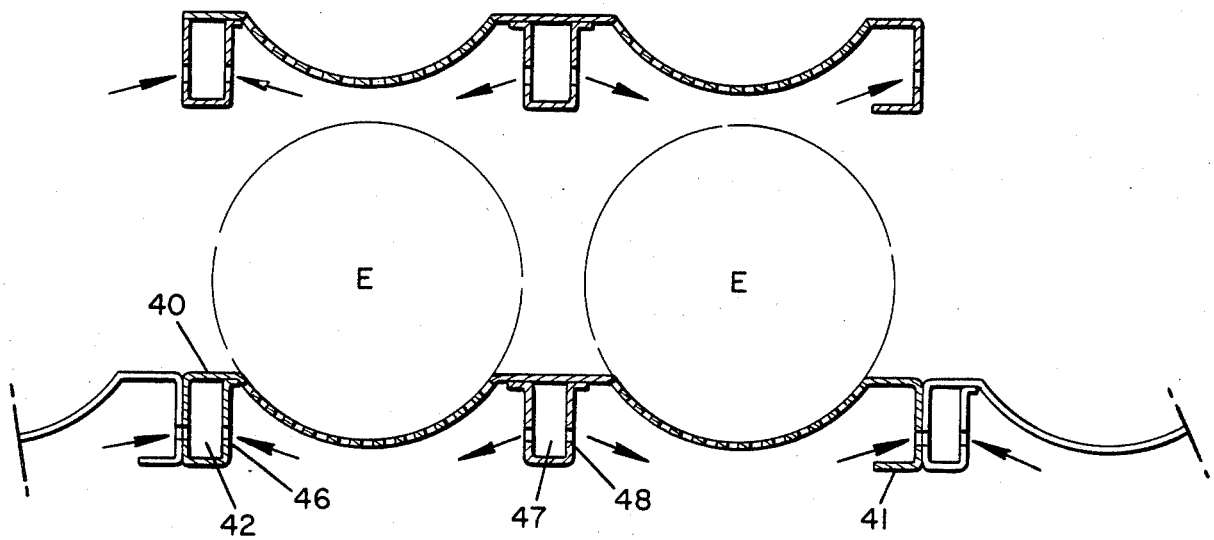
FIG. 5 is a cross-sectional view, similar to FIG. 3, of several cheese shelves of FIG. 4 for Edam cheese.

FIG. 4 is a schematic view from below of a shelf 40 for use instead of the shelf 20 of FIGS. 2 and 3 in the store of FIG. 1. On this shelf 40 on which two rows of Edam cheeses, indicated schematically by E, can be placed in depressions which preferably have perforations, as FIG. 5 shows. This shelf is constructed like the shelf 20, of sheet metal and likewise has a flanged section 41 and a section 42 formed into a duct. The duct 42 is closed at the left-hand end 42 and at its right-hand end 44 is connected to an opening in the right-hand side wall 45. The duct 42 has extraction openings 46.

In the middle, the shelf 40 has a further longitudinal duct 47 on its underside which is provided with supply openings 48, and this duct 47 is closed at its right-hand end 49 and connected at its left-hand end to an opening in the side wall 50 for supply of ventilation air.

As shown in FIG. 4, the openings 46 and 48 are opposite one another, with no cheese E between, but these openings could alternatively have a staggered arrangement longitudinally of the ducts.

The ducts in the shelves shown in FIGS. 2,3,4,5 are thus used for air transport in directions perpendicular to the supporting hollow side walls and the supply and discharge of air takes place by virtue of the connection of the openings in these walls to the ducts in the support shelves.

It is advantageous, especially when storing Edam cheese, as shown in FIG. 4, for each shelf to be provided with both a supply and a discharge duct.

Figure 6:
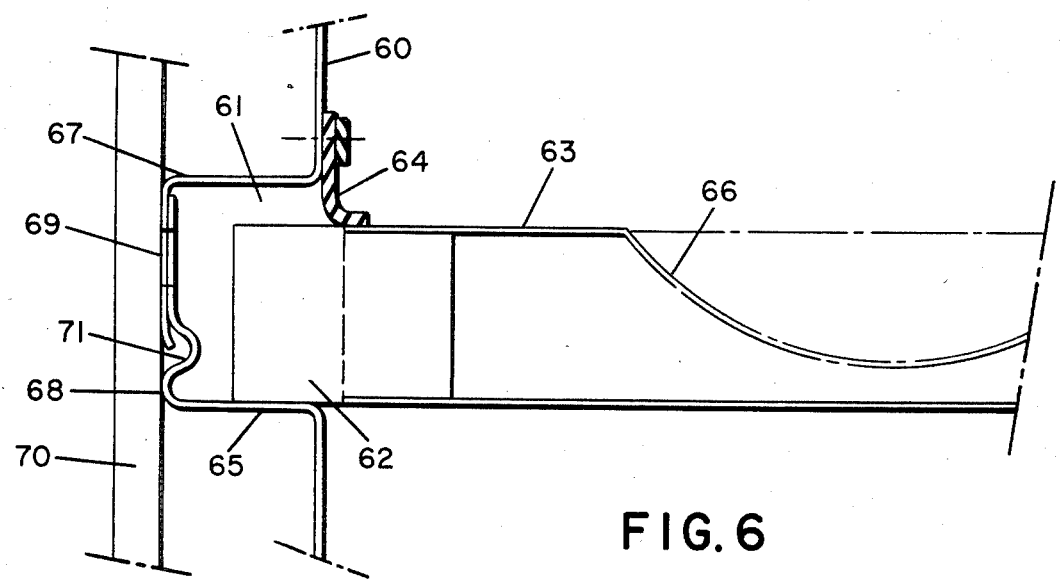
FIG. 6 is a cross sectional view of a moulded component and the connection of a support shelf to as shown in FIG. 2 or FIG. 4 to one side wall.

The shelves illustrated are made mainly of metal, and are provided at each end with a moulded plastics component, which FIG. 6 illustrates. FIG. 6 shows the sheet metal envelope 60 of one hollow side wall, having a groove 61 for the reception of the moulded plastics component 62, which is located at the end of the shelf 63. Above this on the side wall there is a flexible sealing strip 64 which engages the shelf 63 to prevent ventilation air from entering or leaving an unintended region of the system. At 65, the point of contact between the horizontally extending groove wall and the moulded component 62 there is adequate sealing between moulded component and support groove. A depression for reception of the cheese in the shelf 63 is shown at 66 in FIG. 6.

Each groove 61 for supporting the end of a shelf 63 is located in the hollow vertical side wall and preferably forms the junction between two flange-shaped wall sections 67 and 68. These flanges 67,68 can be manufactured by a suitable mechanical process such as rolling. There are vertical columns at intervals in the hollow wall, and one of the flanges of these is indicated by 70 in FIG. 6. The flanges 67,68 are fixed to these columns by bolts (not shown). There is a continuous ridge 71 in the lower flange 68, projecting further than the bolt heads, and serving to locate the moulded plastic component 62. The opening in the wall 60 at the rear wall of the groove 61 for passage of air is indicated by 69.

I claim:
1. Apparatus for storing and ventilating cheeses, having a plurality of shelves for supporting the cheeses, each said shelf having two opposite longitudinal ends, and two hollow side walls supporting said shelves respectively at said ends thereof so that the shelves are arranged vertically one above another, the hollow side walls having passages within them for supply and discharge of ventilating air to the spaces above the respective shelves, wherein each said shelf has at least one longitudinal extending duct for conducting ventilating air along the shelf, which duct is connected at one end of the shelf to a passage in the respective side wall and has, spaced longitudinally along the shelf, a plurality of openings for the ventilating air located at the underside of the shelf.

2. Apparatus for storing and ventilating cheeses, having a plurality of shelves for supporting the cheeses, each said shelf having two opposite longitudinal ends, and two hollow side walls supporting said shelves respectively at said ends thereof so that the shelves are arranged vertically one above another, the hollow side walls having passages within them for supply and discharge of ventilating air to the spaces above the respective shelves, wherein each said shelf has two longitudinally extending ducts for conducting ventilating air along the shelf and respectively for supplying and discharging ventilating air to and from the space beneath the shelf, which ducts are respectively connected at the opposite ends of the shelf to respective supply and discharge openings of said passages in the respective side walls and each have, spaced longitudinally along the shelf, a plurality of openings for respectively supply and discharge of air to and from the said space beneath the shelf.

3. Apparatus according to claim 2, wherein each said shelf is formed at least partly of sheet metal and has opposite longitudinally extending sides, said sheet metal being shaped into a downward flange at each of said sides and one of said flanges being shaped so as to constitute one of said ducts, there further being at each said end of each shelf a molded plastic material support element supporting the shelf and wherein each said side wall has a plurality of grooves receiving said support elements of the shelves, each said support element having a conduit through it connecting a said passage in the side wall to a said duct in the shelf.

4. Apparatus according to any one of claims 1 to 3 further having, at each said end of each shelf, at least one flexible sealing strip engaging the shelf and the side wall to seal therebetween.

5. Apparatus according to any one of claims 1 to 3 wherein the shelves have depressions for the location of the cheeses, which depressions have perforations permitting access of air underneath the shelf to the cheeses on the shelf.

6. Apparatus according to any one of claims 1 to 3 wherein the shelves have depressions for the location of cheeses, which depressions are each formed by a gauze forming a portion of the shelf.

7. Apparatus according to any one of claims 1 to 3 wherein a plurality of said shelves extend between said side walls as an array parallel to one another and at the same level, and wherein the two ducts of each adjacent pair of said ducts in the direction transverse to the longitudinal direction of the shelves in said array have their said openings arranged respectively as supply and discharge openings for the ventilating air, with the respective supply and discharge openings located directly opposite each other.

8. Apparatus according to any one of claims 1 to 3 wherein a plurality of said shelves extend between said side walls as an array parallel to one another and at the same level, and wherein the two ducts of each adjacent pair of said ducts in the direction transverse to the longitudinal direction of the shelves—said array have their said openings arranged respectively as supply and discharge openings for the ventilating air, with the respective supply and discharge openings located opposite each other in a staggered manner in the direction longitudinally of the shelves.

9. Apparatus according to any one of claims 1 to 3 wherein the shelves have depressions for the location of the cheeses, which depressions have perforations permitting access of air underneath the shelf to the cheeses on the shelf, said openings of the said ducts being located at the level of the centres of said depressions.

10. Apparatus according to claim 2 wherein said openings for discharge of the air from the said space beneath the shelf are located in the bottom wall of the discharge duct.

* * * * *